(12) United States Patent
Xie et al.

(10) Patent No.: US 8,799,475 B2
(45) Date of Patent: Aug. 5, 2014

(54) REALIZING METHOD OF PLAYING MULTIMEDIA INFORMATION DURING COURSE OF SESSION ENDING

(75) Inventors: Zhenhua Xie, Shenzhen (CN); Yiwen Liu, Shenzhen (CN)

(73) Assignee: ZTE Corporation (CH)

( * ) Notice: Subject to any disclaimer, the term of this patent is extended or adjusted under 35 U.S.C. 154(b) by 838 days.

(21) Appl. No.: 12/663,921

(22) PCT Filed: Dec. 18, 2007

(86) PCT No.: PCT/CN2007/003656
§ 371 (c)(1),
(2), (4) Date: Dec. 10, 2009

(87) PCT Pub. No.: WO2008/151489
PCT Pub. Date: Dec. 18, 2008

(65) Prior Publication Data
US 2010/0169416 A1 Jul. 1, 2010

(30) Foreign Application Priority Data
Jun. 15, 2007 (CN) .......................... 2007 1 0111364

(51) Int. Cl.
*G06F 15/173* (2006.01)
*G06F 15/16* (2006.01)
*H04L 29/06* (2006.01)
*H04M 3/487* (2006.01)
*H04M 15/00* (2006.01)
*H04W 4/24* (2009.01)
*H04W 76/06* (2009.01)
*H04W 80/10* (2009.01)

(52) U.S. Cl.
CPC ....... *H04L 65/1083* (2013.01); *H04L 29/06278* (2013.01); *H04M 3/487* (2013.01); *H04M 15/00* (2013.01); *H04M 15/57* (2013.01); *H04M 15/63* (2013.01); *H04M 15/8228* (2013.01); *H04M 15/8292* (2013.01); *H04M 15/83* (2013.01); *H04M 15/8355* (2013.01); *H04M 15/44* (2013.01); *H04M 15/844* (2013.01); *H04M 2215/208* (2013.01); *H04M 2215/7833* (2013.01); *H04M 2215/81* (2013.01); *H04M 2215/8116* (2013.01); *H04M 2215/8129* (2013.01); *H04M 2215/8137* (2013.01); *H04W 4/24* (2013.01); *H04W 76/064* (2013.01); *H04W 80/10* (2013.01); *H04L 65/1006* (2013.01); *H04L 65/1069* (2013.01)
USPC ........................................... 709/226; 709/231

(58) Field of Classification Search
CPC ............ H04L 65/1006; H04L 65/1069; H04L 65/1083; H04L 29/06278; H04L 29/0638; H04M 3/487; H04M 15/57; H04M 15/63; H04M 15/8228; H04M 15/8292; H04M 15/83; H04M 15/8355; H04M 15/84; H04M 15/844; H04M 15/00; H04M 2215/208; H04M 2215/7833; H04M 2215/81; H04M 2215/8116; H04M 2215/8129; H04M 2215/8137; H04W 76/064; H04W 80/10
USPC .......................... 709/204, 207, 226, 230, 231
See application file for complete search history.

(56) References Cited

U.S. PATENT DOCUMENTS

| | | | | |
|---|---|---|---|---|
| 7,042,879 | B2 * | 5/2006 | Eschbach et al. | 370/392 |
| 7,599,375 | B2 * | 10/2009 | Abondo | 370/395.21 |
| 7,843,902 | B2 * | 11/2010 | Imbimbo et al. | 370/352 |
| 2006/0056298 | A1 * | 3/2006 | Nag et al. | 370/230 |
| 2006/0104228 | A1 * | 5/2006 | Zhou et al. | 370/328 |
| 2007/0291786 | A1 * | 12/2007 | Maes | 370/465 |
| 2008/0037737 | A1 * | 2/2008 | Lenington | 379/93.05 |
| 2008/0155101 | A1 * | 6/2008 | Welsh et al. | 709/226 |

FOREIGN PATENT DOCUMENTS

| | | |
|---|---|---|
| CN | 1893679 A | 1/2007 |
| CN | 1969582 A | 5/2007 |
| WO | 2006/085070 A1 | 8/2006 |

OTHER PUBLICATIONS

Rosenberg J. et al, "Request for Comments: 3261: SIP: Session Initiation Protocol", Jun. 2002, The Internet Society.*

\* cited by examiner

Primary Examiner — Brian J Gillis
(74) Attorney, Agent, or Firm — Brooks Kushman P.C.

(57) ABSTRACT

A method for implementing a service for playing multimedia information during a session termination process, applied in an IP multimedia subsystem, comprises the following steps: (1) when a party, referred to as a disconnecting party, in a session disconnects the session, a server equipment requesting a media resource function to reserve multimedia information resource for a party with which the session is disconnected by the disconnecting party, referred to as a disconnected party, and to play the multimedia information to the disconnected party; (2) when the disconnected party disconnects the session or the multimedia information playing is finished, the server equipment performing a corresponding disconnection flow to disconnect the session. With the present invention, it can be implemented that during a session termination process, if one party disconnects the session, the other party can receive multimedia information sent to it by the network, which updates the experience of the user.

10 Claims, 1 Drawing Sheet

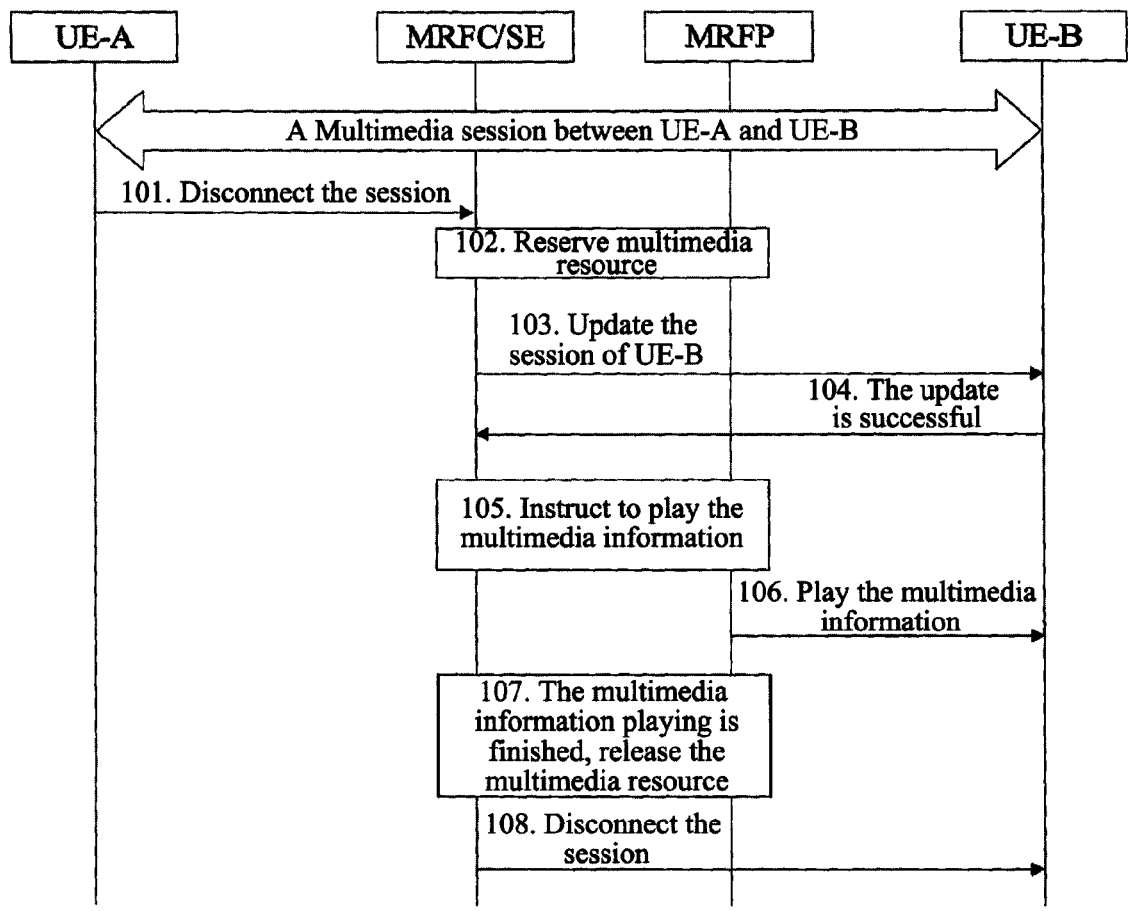

REALIZING METHOD OF PLAYING MULTIMEDIA INFORMATION DURING COURSE OF SESSION ENDING

TECHNICAL FIELD

The present invention relates to the communication field, and more specifically, to a method for implementing multimedia information playing during a session termination process.

BACKGROUND OF THE INVENTION

The IP (Internet Protocol) Multimedia Core Network Subsystem (referred to as IMS for short) is an IP-based network architecture proposed by the $3^{rd}$ Generation Partnership Project (referred to as 3GPP for short), and it constructs an open and flexible service environment that supports multimedia applications and can provide a wide variety of multimedia services for users.

In the IMS service architecture, the control layer is separated from the service layer, and the control layer does not provide particular services, but only provides essential functions such as triggering, routing, charging, etc. The service triggering and control function in the control layer is implemented by the call session control function (referred to as CSCF for short, and divided into three categories: Proxy, Interrogating and Serving, wherein the Serving takes main responsibilities, and Interrogating is optional), and the service layer consists of a series of application servers (referred to as AS for short) and can provide particular services, wherein the AS can be a separate entity or situated in the S-CSCF (Service Call Session Control Function). The control layer (S-CSCF) controls service triggering according to customer subscription information and invokes services on the ASs to implement service functions. The AS and S-CSCF are collectively called server equipments (SE). The end-to-end equipments in a session are called user equipments (UE), in charge of the interaction with the users. These functional entities use the Session Initiation Protocol (SIP) to communicate. In the services required to play multimedia information, the participation of the media resource function (referred to as MRF for short) is required; the MRF is divided into a control part MRFC and a processing part MRFP, and the MRFC is in charge of translating and interpreting the SIP signaling of a SE into instructions for the MRFP, or reversely, translating and interpreting a response from the MRFP into SIP signaling to be sent to the SE, while the MRFP is in charge of sending and receiving a media stream.

When a multimedia session is established between two terminals, if one of them disconnects the session, the session termination process is entered, and for users, this process seems dull and boring. On the other hand, at present, if a user intends to acquire some information, such as the balance of the prepaid phone expense, a session has to be established specially for this interrogation, which is not convenient.

SUMMARY OF THE INVENTION

The objective of the present invention is to propose a method for implementing a service for playing multimedia information during a session termination process.

The technical scheme used in the present invention is:

a method for implementing a service for playing multimedia information during a session termination process, applied in an Internet Protocol multimedia subsystem, comprising the following steps of:

(1) when a party, referred to as a disconnecting party, in a session disconnects the session, a server equipment requesting a media resource function to reserve multimedia information resource for a party with which the session is disconnected by the disconnecting party, referred to as a disconnected party, and to play the multimedia information to the disconnected party;

(2) when said disconnected party disconnects the session or the multimedia information playing is finished, said server equipment performing a corresponding disconnection flow to disconnect the session.

Furthermore, said server equipment and said media resource function are network equipments of the disconnecting party or the disconnected party.

Furthermore, step (1) specifically comprises:

(11) said disconnecting party sending a disconnection message to said server equipment;

(12) when receiving said disconnection message, said server equipment requiring the media resource function to reserve multimedia information resource for the disconnected party;

(13) if the resource reservation is successful, said server equipment updating the session of the disconnected party to let it establish a multimedia session connection with said media resource function;

(14) said server equipment playing the multimedia information to the disconnected party through said media resource function.

Furthermore, said corresponding disconnection flow in step (2) is specifically:

if said disconnected party disconnects the session, said server equipment requiring said media resource function to release resource associated with the multimedia information, and disconnecting the session;

if said multimedia information playing is finished, said media resource function notifying said server equipment, and said server equipment requiring said media resource function to release resource associated with the multimedia information; then the server equipment sending a disconnection message to said disconnected party to disconnect the session.

Furthermore, in step (12), said server equipment requiring said media resource function to reserve multimedia information resource refers to the server equipment requiring, through a control part in said media resource function, a processing part in said media resource function to reserve multimedia information resource.

Furthermore, step (13) specifically comprises:

(131) if said multimedia information resource reservation is successful, said server equipment sending an update message to the disconnected party;

(132) when receiving the update message, said disconnected party updating the session and restarting a negotiation on a media plane to establish a multimedia session connection with said media resource function; and if the update is successful, the disconnected party notifying said server equipment.

Furthermore, said disconnection message in step (11) is a BYE message.

Furthermore, said update message in step (131) is an INVITE message, and a session identification of said INVITE message is the same as a session identification of the original session of the disconnected party.

Furthermore, step (14) specifically comprises:

(141) said server equipment requiring, through the control part in said media resource function, the processing part in said media resource function to start to play the multimedia information;

(142) according to the requirement, the processing part in said media resource function playing the multimedia information to said disconnected party.

Furthermore, said corresponding disconnection flow in step (2) is specifically:

if the disconnected party disconnects the session, the server equipment requiring, through the control part in the media resource function, the processing part in the media resource function to release resource associated with the multimedia information, and disconnecting the session;

if the multimedia information playing is finished, the processing part in the media resource function notifying said server equipment through the control part in the media resource function, and the server equipment requiring, through the control part in the media resource function, the processing part in the media resource function to release resource associated with the multimedia information; then the server equipment sending a disconnection message to the disconnected party to disconnect the session.

With the present invention, it can be implemented that during a session termination process, if one party disconnects the session, the other party can receive multimedia information sent to it by the network, which updates the experience of the user. Moreover, if information such as the balance of the prepaid phone expense of the user is played, it facilitates the use by the user.

BRIEF DESCRIPTION OF THE DRAWINGS

FIG. 1 is a flow chart of a particular implementation of the method for implementing multimedia information playing during a session termination process in accordance with the present invention.

PREFERRED EMBODIMENTS OF THE PRESENT INVENTION

The technical scheme of the present invention will be described in detail in conjunction with the figures and embodiments.

FIG. 1 illustrates a flow chart of a particular implementation of the method for implementing multimedia information playing during a session termination process in accordance with the present invention. If the equipment of one party (such as UE-A) in a session terminates the session with the equipment of the other party (such as UE-B), a SE updates the session of the disconnected party, i.e. UE-B, to let it establish a session with the media resource function, and plays multimedia information to it, and then disconnects this session with UE-B when the information playing is finished; wherein UE-A is the disconnecting party. The multimedia information may be played by the network of the disconnecting party or by the network of the disconnected party, therefore, the SE, MRFC and MRFP in FIG. 1 may denote equipments of the disconnecting party or denote equipments of the disconnected party, and since the MRFC and SE can be one physical entity, they are depicted in one entity block in FIG. 1.

Supposing a multimedia session is established between UE-A and UE-B previously, particular steps of the method are:

Step 101, UE-A disconnects the session, for instance, by sending a BYE message to UE-B;

Step 102, when the disconnection message passes the SE, the SE requires the MRFP to reserve multimedia information resource through the MRFC, and acquires the address of UE-B from the disconnection message;

Step 103, if the resource reservation is successful, the SE sends an update message to UE-B to update the session of UE-B and let it establish a multimedia session connection with the MRF, for instance, by sending an INVITE message to UE-B and making the session ID of this message be the same as the session ID of the original session of UE-B to restart a negotiation on the media plane;

Step 104, when receiving the update message, UE-B updates its session to establish a multimedia session connection with the MRF; and if the update is successful, it notifies the SE, for instance, by sending a response message, such as "200 (OK)", to the SE;

Step 105, the SE requires the MRFP to start to play the multimedia information through the MRFC;

Step 106, the MRFP plays the multimedia information to UE-B according to the requirement;

Step 107, when UE-B disconnects the session or the multimedia information playing is finished; continue a corresponding disconnection flow as follows:

If UE-B disconnects the session, that is, UE-B sends a BYE message to the SE, then the corresponding disconnection flow is: the SE requires, through the MRFC, the MRFP to release the resource associated with the multimedia information and disconnects the session;

If the multimedia information playing is finished, as shown in FIG. 1, the corresponding disconnection flow is: the MRFP notifies the SE through the MRFC, and the SE requires, through the MRFC, the MRFP to release the resource associated with the multimedia information; then proceed to Step 108;

Step 108, the SE sends a BYE message to UE-B and disconnects the session.

Of course, the present invention may have a plurality of other embodiments, and without departing from the spirit and essence of the present invention, those skilled in the art shall be able to make various corresponding modifications and variations according to the present invention, but all such corresponding modifications and variations shall be within the scope of the appended claims of the present invention.

INDUSTRIAL APPLICABILITY

With the present invention, it can be implemented that during a session termination process, if one party disconnects the session, the other party can receive multimedia information sent to it by the network, which updates the experience of the user. Moreover, if information such as the balance of the prepaid phone expense of the user is played, it facilitates the use by the user.

What we claim is:

1. A method for implementing a service for playing multimedia information during a session termination process, applied in an Internet Protocol multimedia subsystem, comprising the following steps of:
   (1) when a party, referred to as a disconnecting party, disconnects the session with another party, referred to as a disconnected party, a server equipment informing the disconnected party of updating the session of the disconnected party, to let it establish a multimedia session connection with a media resource function, and playing the multimedia information to the disconnected party through the media resource function;
   (2) when said disconnected party disconnects the session or the multimedia information playing is finished, said server equipment performing a corresponding disconnection flow to disconnect the session.

2. A method of claim 1, wherein said server equipment and said media resource function are network equipments of the disconnecting party or the disconnected party.

3. A method of claim 1, wherein step (1) specifically comprises:
- (11) said disconnecting party sending a disconnection message to said server equipment;
- (12) when receiving said disconnection message, said server equipment requiring the media resource function to reserve multimedia information resource for the disconnected party;
- (13) when the resource reservation is successful, said server equipment updating the session of the disconnected party to let it establish a multimedia session connection with said media resource function;
- (14) said server equipment playing the multimedia information to the disconnected party through said media resource function.

4. A method of claim 3, wherein said corresponding disconnection flow in step (2) is specifically:
- when said disconnected party disconnects the session, said server equipment requiring said media resource function to release resource associated with the multimedia information, and disconnecting the session;
- when said multimedia information playing is finished, said media resource function notifying said server equipment, and said server equipment requiring said media resource function to release resource associated with the multimedia information; then the server equipment sending a disconnection message to said disconnected party to disconnect the session.

5. A method of claim 3, wherein, in step (12), said server equipment requiring said media resource function to reserve multimedia information resource refers to the server equipment requiring, through a control part in said media resource function, a processing part in said media resource function to reserve multimedia information resource.

6. A method of claim 5, wherein step (14) specifically comprises:
- (141) said server equipment requiring, through the control part in said media resource function, the processing part in said media resource function to start to play the multimedia information;
- (142) according to the requirement, the processing part in said media resource function playing the multimedia information to said disconnected party.

7. A method of claim 5, wherein said corresponding disconnection flow in step (2) is specifically:
- when the disconnected party disconnects the session, the server equipment requiring, through the control part in the media resource function, the processing part in the media resource function to release resource associated with the multimedia information, and disconnecting the session;
- when the multimedia information playing is finished, the processing part in the media resource function notifying said server equipment through the control part in the media resource function, and the server equipment requiring, through the control part in the media resource function, the processing part in the media resource function to release resource associated with the multimedia information; then the server equipment sending a disconnection message to the disconnected party to disconnect the session.

8. A method of claim 3, wherein step (13) specifically comprises:
- (131) when said multimedia information resource reservation is successful, said server equipment sending an update message to the disconnected party;
- (132) when receiving the update message, said disconnected party updating the session and restarting a negotiation on a media plane to establish a multimedia session connection with said media resource function; and when the update is successful, the disconnected party notifying said server equipment.

9. A method of claim 8, wherein said disconnection message in step (11) is a BYE message.

10. A method of claim 8, wherein said update message in step (131) is an INVITE message, and a session identification of said INVITE message is the same as a session identification of the original session of the disconnected party.

* * * * *